J. L. PIPE.
SCALE.
APPLICATION FILED SEPT. 29, 1908.
939,857.
Patented Nov. 9, 1909.
2 SHEETS—SHEET 1.
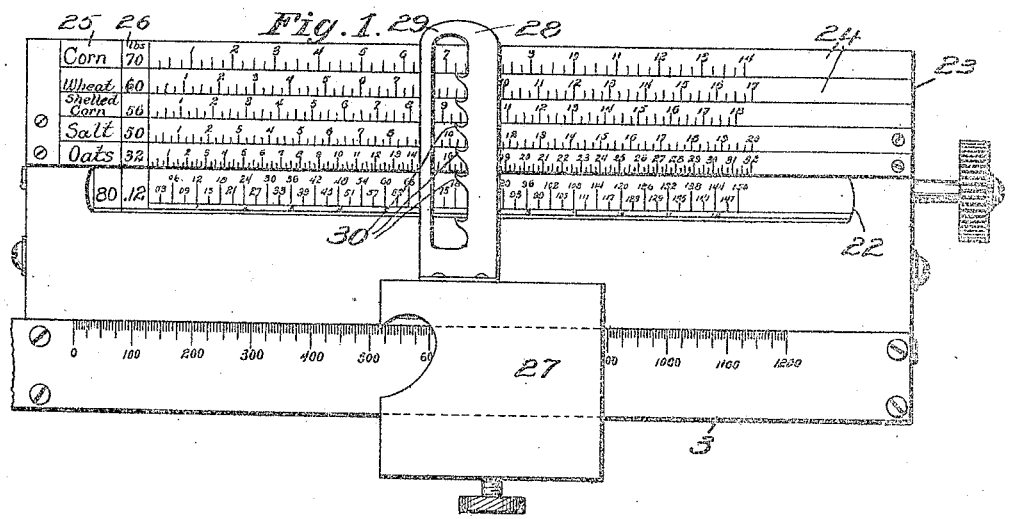
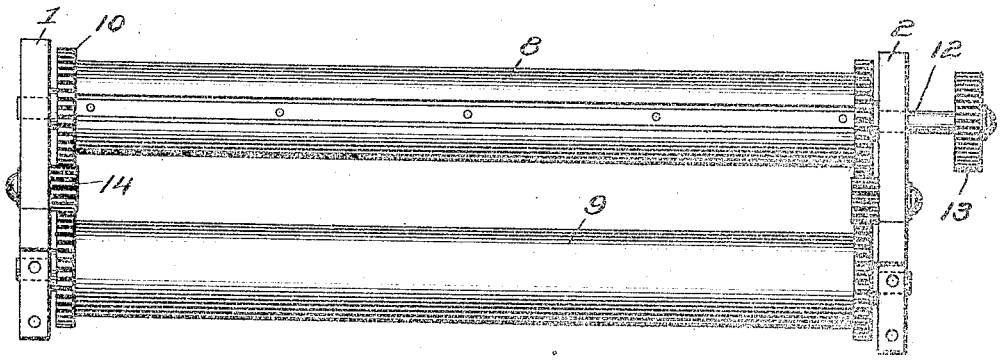
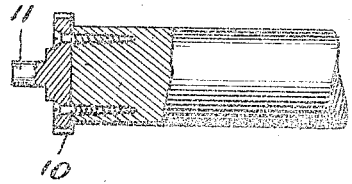
Witnesses
Louis R. Heinrichs
D. W. Gould
Inventor
John L. Pipe
By Victor J. Evans
Attorney

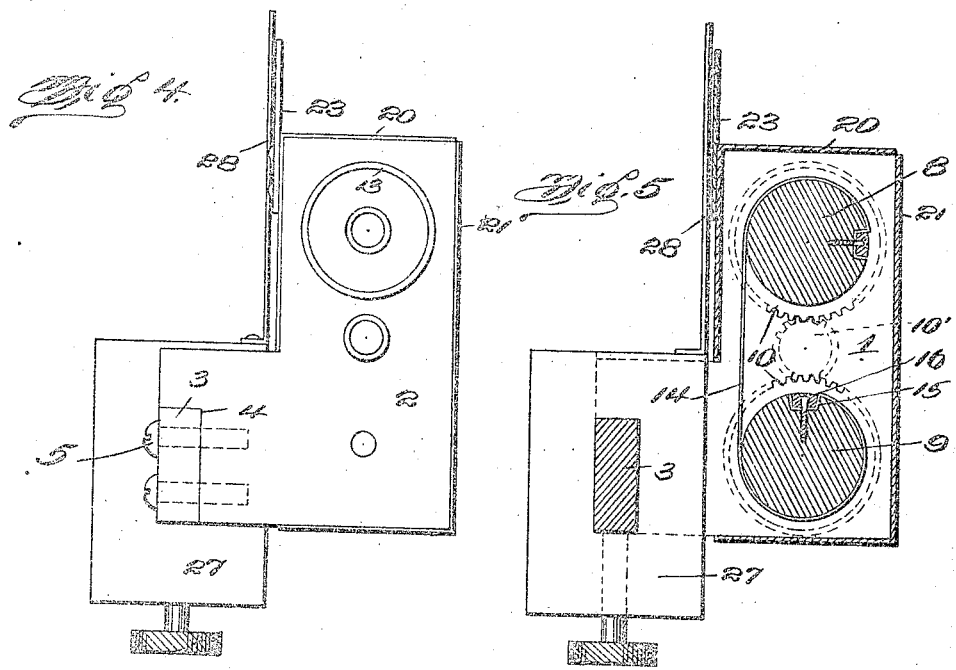
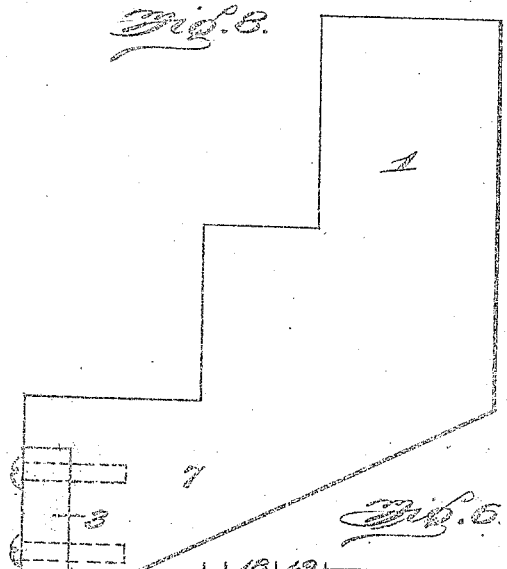
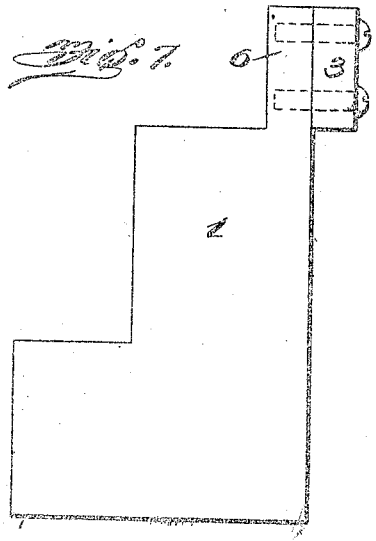

UNITED STATES PATENT OFFICE.

JOHN L. PIPE, OF QUINCY, ILLINOIS.

SCALE.

939,857.

Specification of Letters Patent.   Patented Nov. 9, 1909.

Application filed September 29, 1908. Serial No. 455,322.

*To all whom it may concern:*

Be it known that I, JOHN L. PIPE, a citizen of the United States, residing at Quincy, in the county of Adams and State of Illinois, have invented new and useful Improvements in Scales, of which the following is a specification.

The invention relates to an improvement in scales, and is more particularly directed to an attachment designed for connection with the usual scale beam and adapted in use to automatically compute the price of a given commodity in accordance with the weight of such commodity on the scale platform.

The main object of the present invention is the provision of a scale attachment including a manually operable chart carrying a series of computations, in which the different weights of commodities at varying prices are figured out, the chart being arranged for such movement as to cause any particular line of computations to be exposed to view, the attachment being arranged with direct relation to the pound indicating marks on the scale beam and the poise on such beam being provided with a pointer designed to indicate the particular price on the exposed portion of the chart in accordance with the number of pounds indicated on the scale beam.

Another object of the invention is the provision of an indicating plate forming part of the attachment and divided to indicate a specific measure of the different commodities, as a bushel in particular accordance with the weight of that measure in pounds, so that the operator may from the indicating plate determine the number of bushels of material on the scale in accordance with the known number of pounds per bushel of such material and then determine the price of the amount of material on the scale in accordance with the particular column of the chart bearing the specific price per bushel.

The invention will be described in the following specification, reference being had particularly to the accompanying drawings, in which:—

Figure 1 is a view in elevation of my improved attachment, showing the same applied to a scale beam. Fig. 2 is an elevation of the same detached from the beam with the cover plate and indicating plate removed. Fig. 3 is a broken section, partly in elevation of one of the chart rollers. Fig. 4 is an end elevation of the attachment as applied to the ordinary scale beam. Fig. 5 is a vertical section through the attachment. Fig. 6 is a diagrammatic view illustrating a portion of the chart. Fig. 7 illustrates an elevation showing a slightly different form of standard. Fig. 8 is a similar view showing another form of standard.

Referring to the accompanying drawings, wherein is illustrated the preferred form of the present invention, the improved attachment comprises uprights or standards 1 and 2 of duplicate form and designed to be secured at opposing ends of a scale beam 3. In the application of the attachment as a part of a scale during the manufacture of the latter the forward edges of the standards are recessed, as at 4, to snugly receive the scale beam, bolts 5, or other securing means connecting the parts. In the application of the attachment to scales already in use and under conditions in which the want of room above the upper beam necessitates the use of the lower or tare beam the standards are provided at their upper rear portions with extensions 6 designed to contact and be connected with the lower beam as in Fig. 7. In applying the uprights to the upper beam the standards are provided with projections 7 recessed on their forward edges as in the preferred form. the form of standard for this use being illustrated in Fig. 8.

Arranged in vertical spaced relation between the standards 1 and 2 are rollers 8 and 9 hereinafter designated as upper and lower chart rollers. Secured on each end of the respective rollers is a gear wheel 10 having a stub shaft projection 11 designed to seat in a suitably formed bearing in the respective standards, one of the stub shafts of the upper roller being preferably elongated to extend beyond the outer surface of the adjacent upright, as at 12, and is terminally provided with a roughened roller 13, whereby manual operation of the chart, as hereinafter described, is provided for. The vertically alined gears 10 of the respective rollers are in mesh with an intermediate pinion 10′ mounted in the upright between the rollers, the intermeshing of the gears described insuring an even and uniform movement of both rollers in the operation of the hand roller 13.

Secured upon the rollers 8 and 9 is the chart comprising a strip of substantial flexible material 14, the ends of which are removably secured to the respective rollers preferably by seating such ends in longitudinally arranged grooves 15 in the surface of the rollers and fixing the strips by filling blocks 16 secured within the grooves, as clearly shown in Fig. 5. The chart is divided into a series of horizontally arranged columns 17, at each end of which there are arranged two vertical columns 18 and 19. The chart in the particular instance illustrated is computed on the basis of a bushel as the primary measure, and the extreme outer vertical column indicates the number of pounds in a bushel of a particular commodity, while the relatively inner vertical column indicates the price per bushel of such commodity. Each horizontal column is divided by a series of indicating lines to indicate bushels, quarter bushels, and half bushels, and at the upper end of each indicating line there are arranged one or more figures indicating the price for the particular quantity of material noted by such indicating line in accordance with the price per bushel noted in the innermost vertical column alined with the particular horizontal column.

The chart is graduated in the horizontal column with particular arrangement to the pound marks on the scale beam 3, that is to say that in a horizontal column based upon eighty pounds to the bushel the first indicating mark, which denotes one quarter of a bushel, will, as later described register for reading purposes with the twenty pound mark on the scale beam, while in a horizontal column divided on the basis of sixty pounds to the bushel the first indicating mark will register with the fifteen pound mark on the scale beam, and so on throughout the series of columns on the chart.

In connection with the parts described I use a cover plate made up of two right angled sections 20 and 21, the former designed to embrace the upper and forward edges of the uprights and the latter the rear and lower edges thereof, said sections, of course, extending throughout the length of the attachment between the uprights and concealing and protecting the movable parts. The vertical portion of the section 20 of the cover is formed with a horizontally arranged sight opening 22 of such length and height as to permit the exposure therethrough of any particular horizontal column of the chart in accordance with the operation of the rollers. By this means the operator knowing the weight and price of the commodity can arrange the particular chart column in the plane of the opening 22 and thereby dispose the parts for the automatic pricing in accordance with the invention.

Secured to the uprights and overlying the vertical portion of the section 20 of the cover plate is what I term an indicating plate 23 on which is arranged a series of horizontal columns 24 graduated in quarter bushels of various commodities, each horizontal column having at one end thereof two vertical divisions 25 and 26, in the first of which there is indicated the particular commodity and in the second of which there is indicated the number of pounds of such commodity to the bushel. The indicating lines in the horizontal columns 24 are, of course, spaced with particular regard to the pound marks on the scale, as previously described in connection with the chart, so that any particular indicating mark in one of the horizontal columns 24 will register through a pointer, to be described, with the pound mark on the scale beam in accordance with the number of pounds of the particular commodity indicated by the mark in the column 24.

Secured to the poise 27 operative on the beam 23 is a pointer 28, preferably a strip rising from and secured to the poise and formed with an elongated opening 29, the rear vertical wall of which has a series of projecting points 30. The points are so arranged as to register respectively with the columns 24 on the indicating plate and the exposed column on the chart, it being understood that the pointer is so arranged with relation to the poise that the particular points 30 will register with the proper indicating marks on the respective columns of the chart and plate in strict accordance with the number of pounds indicated by the poise on the scale beam. In other words if the exposed column of the chart is that indicating eighty pounds to the bushel and the poise indicates five hundred and twenty pounds, as shown, the point 30 coöperating with the exposed chart column will register with the six and one-half bushel mark on such column, the remaining pointers on the plate denoting the proper indicating marks in strict accordance with the number of pounds indicated by the poise.

From the above description taken in connection with the drawings, it will be understood that the price of any particular commodity within the range of the chart will be automatically indicated in the weighing of such commodity. For example assuming the commodity to weigh eighty pounds to the bushel and to be priced at twelve cents per bushel, with five hundred and twenty pounds of the commodity on the scale the point 30 on the exposed chart column, which chart has been arranged to expose the proper column, will register with that line bearing at its top the numeral 78, or in other words the price of the quantity of the commodity on the scale will be seventy-eight cents. By the use of the indicating plate the necessity of having more than one chart of prices and bushels is avoided, as with the plate the operator in weighing the commodity could readily discover the number of bushels and parts of bushels in the quantity of commodity being weighed in accordance with that particular column 24 indicating the known number of pounds per bushel of the commodity. Having thus determined the quantity and setting the chart to expose that column indicating the particular price per bushel, he can, by consulting the indicating mark on the exposed chart column corresponding to the bushel mark noted on the particular plate column, learn the exact price of the quantity of the commodity being weighed. That column 24 on the plate noted at fifty pounds per bushel is advantageous in computing the weight of a commodity by the hundred weight or ton, for example suppose the operator desires to compute a load of hay at sixty-five cents per hundred weight. The chart column indicating thirty-two and one-half cents per bushel, which on the basis of sixty-five cents per hundred weight is the price of a bushel weighing fifty pounds, and then take the reading on the particular plate column indicated by the weight of the commodity on the scales. Such weight would be indicated in the plate column as so many bushels, and by then referring to the corresponding number of bushels on the exposed chart column would find indicated the price at thirty-two and one-half cents per bushel of fifty pounds or sixty-five cents per hundred weight.

It is to be understood, of course, that for convenience a few only of the various weights per bushel and prices per bushel are indicated, and that the invention contemplates the use of any number of columns at any weight or price per bushel or of columns indicating weights and prices of other measures.

The attachment is readily applied as an entirety to any platform or other scales, the sole requirement being that with the poise indicating a certain number of pounds the points should register with the corresponding indicating marks on the various columns. As the chart and indicating plate have at all times a fixed relation so far as the indicating marks are concerned, the adjustment of the attachment on a scale beam to cause a proper registry of any particular mark on any of the columns will set the attachment for all.

Having thus described the invention what is claimed as new, is:—

The combination with a scale beam, of an attachment therefor comprising standards adapted to be removably secured to the beam, rollers mounted for simultaneous movement in the standards, an indicating chart arranged on the rollers, a cover inclosing the rollers and chart and formed with an opening through which a desired portion of the chart may be exposed, a poise for the beam, a pointer carried by the poise and beam, a pointer carried by the poise and registering with the exposed portion of the chart, and a fixed scale plate secured on the cover and arranged above the sight opening therein, said pointer being adapted to coöperate with the indicating marks on the scale plate.

In testimony whereof I affix my signature in presence of two witnesses.

JOHN L. PIPE.

Witnesses:
 GEO. H. UNDERBRINK,
 ALFRED C. PIPE.